Feb. 9, 1937.   S. W. E. ANDERSSON   2,069,808
GAS REGULATOR
Filed June 14, 1934
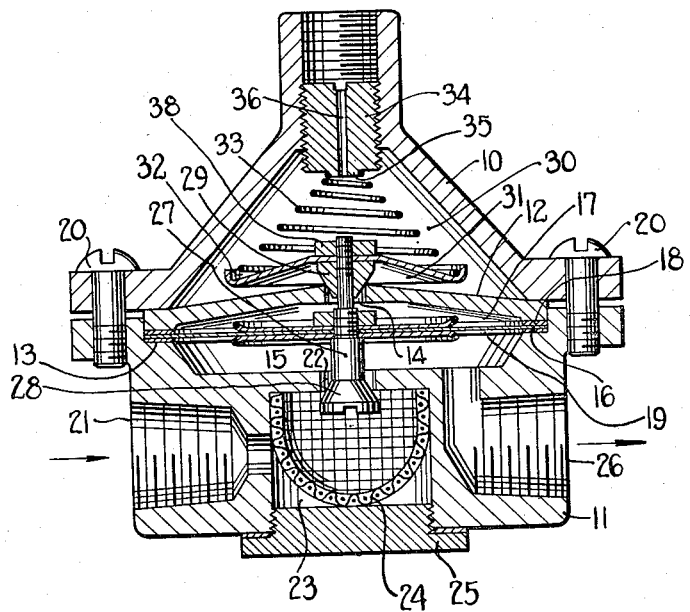
INVENTOR
Sven W. E. Andersson
BY
ATTORNEY Patented Feb. 9, 1937

2,069,808

UNITED STATES PATENT OFFICE 2,069,808

GAS REGULATOR

Sven W. E. Andersson, Evansville, Ind., assignor, by mesne assignments, to Servel, Inc., Dover, Del., a corporation of Delaware Application June 14, 1934, Serial No. 730,585

1 Claim. (Cl. 50—23)

My invention relates to gas pressure regulators for reducing the pressure of gas flowing to a burner or the like and for normally maintaining the pressure supply to the burner at a constant value.

An object of my invention is to provide a regulator which is compact and of simple construction, and which includes means for preventing the escape of gas to the atmosphere in the event that the diaphragm of the regulator should develop a leak, and which, upon rupture of the diaphragm, will effectively prevent further leakage.

Further objects and advantages will be apparent from consideration of the following description taken in conjunction with the accompanying drawing forming a part of this specification, which drawing is a vertical sectional view of a preferred form of regulator embodying my invention.

Referring to the drawing, the regulator comprises an upper casing member 10 and a lower casing member 11 between which is disposed a rigid transverse member or partition 12 which rests in a recessed portion 13 of casing member 11. Partition 12 is provided with an orifice 14. Clamped between the partition 12 and the casing member 11 is a flexible diaphragm 16 forming one side of a chamber 15. The parts are so shaped that there is a space 17 between the rigid partition 12 and diaphragm 16. The casing members 10 and 11, the partition 12, and gaskets 18 and 19 are held firmly together by means of screws 20. The gaskets 18 and 19 provide a tight seal against the escape of gas around the edges of the diaphragm.

Lower casing member 11 is provided with a gas inlet port 21, an interior space 23, and a gas outlet port 26. Gas flows through inlet port 21 and valve opening or orifice 22 into chamber 15 and thence to the outlet 26. In the space 23 between inlet port 21 and orifice 22 is a gas filter 24. A plug 25 provides access to the filter for cleaning or removal thereof.

Centrally attached to diaphragm 16 is a valve stem 27, one end of which extends downwardly within orifice 22 and is formed with or has attached thereto a valve member 28 which is adapted to seat against the lower edge of orifice 22. The other end of the valve stem extends upwardly through orifice 14 in rigid member 12 and is provided with a valve member 29 positioned in a chamber 30, which valve member 29 is adapted to seat against the upper edge of orifice 14. A disc 31 is secured to stem 27 as by being clamped between valve member 29 and a nut 38. The outer edge of disc 31 is flanged to form a groove 32 in which rests one end of a regulating spring 33 which acts against the pressure of gas in chamber 15 to balance said pressure and to maintain valve 28 normally open, in a position depending upon the pressure of gas in chamber 15. A screw 34 having a small extrusion at its lower end which fits into the opposite end of the conical spring 33 serves to regulate the tension of spring 33. A vent hole 36 extends centrally through the adjustment screw 34.

In operation, gas enters inlet port 21 and passes through the filter 24 and through throttling orifice 22 into chamber 15. Thence the gas passes through outlet 26 to the point of use. If the gas pressure in chamber 23 should rise there will be a corresponding rise of pressure acting against diaphragm 16. The increase in pressure causes upward movement of the valve stem, as shown, and valve member 28 is moved upwardly to restrict flow through orifice 22, as a result of which less gas is supplied to chamber 15 and the pressure decreases, due to which the spring 33 moves the valve member 28 toward its original position. Conversely if the pressure drops in chamber 15 the greater force of the spring 33 with relation to the pressure acting against the diaphragm 16 will increase the valve opening or supply of gas to chamber 15. Thus the device normally acts to maintain a constant pressure of gas in chamber 15, and consequently a constant pressure of gas supplied to the point of use through outlet 26. The pressure of the gas supplied can be regulated by turning the adjusting screw 34. Thus the valve normally acts' as an ordinary reducing valve. The pressure in chamber 17 is that of the atmosphere, valve 29 being normally open. The pressure of atmosphere is imposed on the upper side of the diaphragm through the vent opening 36. Should the diaphragm rupture, gas will pass through the diaphragm into chamber 17. This will equalize the pressure on the two sides of the diaphragm since the vent hole 36 is small. Consequently, the force opposing the spring 33 is substantially neutralized and the spring 33 acts downwardly on the valve stem 27. This serves to move the valve stem and attached parts downwardly and to close the orifice 14 and open orifice 22 wide. The closing of orifice 14 prevents the further escape of the gas and the regulator is now transformed into a fully open unadjustable valve. The gas will now flow through the regulator at full line pressure and the increase in size of flame or increase in flow will serve as an indication of the ruptured diaphragm so that the user will be told that the diaphragm should be replaced.

What I claim is:

A gas pressure regulator including a valve casing having inlet and outlet ports, a throttle valve for controlling flow of gas between said ports, a flexible diaphragm subjected on one side to pressure of gas which has passed said throttle valve and connected to operate said valve, a partition in said casing having a passage therethrough and forming a chamber on the other side of said diaphragm, a second valve for controlling said passage and operatively connected to said diaphragm, a screw plug in said casing having a passage therethrough providing communication from within said casing beyond said partition to the atmosphere, whereby said other side of the diaphragm is subjected to atmospheric pressure when said second valve is open, and a spring arranged to oppose the pressure exerted on said diaphragm by the gas, the tension of said spring being adjustable by turning said screw plug.

SVEN W. E. ANDERSSON.